(12) United States Patent
Toshitani (10) Patent No.: US 9,970,330 B2
(45) Date of Patent: May 15, 2018

(54) INSTALLING STRUCTURE FOR ELECTRIC VARIABLE VALVE TIMING APPARATUS

(71) Applicant: TOYOTA JIDOSHA KABUSHIKI KAISHA, Toyota-shi (JP)

(72) Inventor: Hiroki Toshitani, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 93 days.

(21) Appl. No.: 15/238,907

(22) Filed: Aug. 17, 2016

(65) Prior Publication Data
US 2017/0058725 A1    Mar. 2, 2017

(30) Foreign Application Priority Data

Aug. 24, 2015   (JP) ................. 2015-164990

(51) Int. Cl.
| | |
|---|---|
| *F01L 1/46* | (2006.01) |
| *F01L 1/02* | (2006.01) |
| *F16H 57/035* | (2012.01) |
| *F16H 7/06* | (2006.01) |
| *F16H 57/025* | (2012.01) |
| *F01L 1/344* | (2006.01) |
| *F01L 1/352* | (2006.01) |
| *F01L 13/00* | (2006.01) |
| *F02F 7/00* | (2006.01) |
| *F01L 1/053* | (2006.01) |

(52) U.S. Cl.
CPC ............... *F01L 1/022* (2013.01); *F01L 1/344* (2013.01); *F01L 1/352* (2013.01); *F16H 7/06* (2013.01); *F16H 57/025* (2013.01); *F16H 57/035* (2013.01); *F01L 1/053* (2013.01); *F01L 1/46* (2013.01); *F01L 2013/103* (2013.01); *F01L 2103/00* (2013.01); *F01L 2250/02* (2013.01); *F01L 2800/17* (2013.01); *F01L 2820/032* (2013.01); *F02F 2007/0063* (2013.01); *F02F 2007/0075* (2013.01)

(58) Field of Classification Search
CPC ....... F01L 1/022; F01L 1/46; F01L 2013/103; F01L 2250/02; F01L 2800/17; F01L 2820/032; F02F 2007/0063; F02F 2007/0075
USPC ................... 123/90.17, 90.31, 90.38
See application file for complete search history.

(56) References Cited

U.S. PATENT DOCUMENTS 6,948,464 B2* 9/2005 Ido ................ H02K 7/003
123/90.15

FOREIGN PATENT DOCUMENTS

JP        2009-293574       12/2009

\* cited by examiner

*Primary Examiner* — Jorge Leon, Jr.
(74) *Attorney, Agent, or Firm* — Oblon, McClelland, Maier & Neustadt, L.L.P.

(57) ABSTRACT

An electric variable valve timing apparatus includes a sprocket unit and an electric motor. The electric motor is fixed to a chain cover with bolts. The chain cover includes plural bosses each having an internal thread to which one of the bolts is threaded. The bosses extend from the chain cover toward the sprocket unit to positions at which the bosses face an outer periphery of the sprocket unit in a radial direction. The bosses are arranged such that, when the sprocket unit moves downward from an attaching position, at which the sprocket unit is attached to the camshaft, at least two bosses are engaged with the sprocket unit to restrict downward movement of the sprocket unit, and that the sprocket unit is allowed to move between a location outside of a space covered by the chain cover and the attaching position.

9 Claims, 8 Drawing Sheets

INSTALLING STRUCTURE FOR ELECTRIC VARIABLE VALVE TIMING APPARATUS

BACKGROUND

The present disclosure relates to an installing structure for an electric variable valve timing mechanism, which is actuated by an electric motor attached to a chain cover.

In recent years, a number of internal combustion engines, which are drive sources mounted in vehicles such as automobiles, have been equipped with variable valve timing apparatuses for varying the opening-closing timing of engine valves (so-called, valve timing) of intake valves or exhaust valves. Japanese Laid-Open Patent Publication No. 2009-293574 proposes the use of an electric type variable valve timing apparatuses.

An electric variable valve timing apparatus, for example, has the configuration described below. This variable valve timing apparatus includes a sprocket unit fixed to one end of the camshaft of the internal combustion engine. The sprocket unit includes a first rotor fixed to one end of the camshaft, a second rotor surrounding the circumference of the first rotor, and a sprocket, which is integrally formed with the outer periphery of the second rotor. A timing chain is looped over the sprocket. The sprocket unit also includes a varying mechanism, which is located between the first rotor and the second rotor to couple the first rotor and the second rotor while allowing the rotors to rotate relative to each other. The variable valve timing apparatus further includes an electric motor for actuating the varying mechanism. The electric motor is fixed to the chain cover with bolts and coupled to the varying mechanism.

In the variable valve timing apparatus, the varying mechanism is actuated through control of the electric motor to change the relative rotational angle between the first rotor and the second rotor. This changes the relative rotational angle between the camshaft, which is fixed to the first rotor, and the crankshaft, which is coupled to the second rotor by the timing chain and the sprocket. Accordingly, the valve timing is varied.

In the above described variable valve timing apparatus, the sprocket unit is arranged in the space that is covered by the chain cover, that is, the space defined by the chain cover and the engine body (the cylinder head and the cylinder block). Thus, for example, at repair of the variable valve timing apparatus, removing operation or attaching operation of the sprocket unit particularly with the engine mounted in the vehicle needs to be performed in the narrow space covered by the chain cover. Therefore, the worker may inadvertently drop the sprocket unit into the space.

SUMMARY

Accordingly, it is an objective of the present disclosure to provide an installing structure for an electric variable valve timing apparatus that restrains falling of a sprocket unit into a space covered by a chain cover at removing operation or attaching operation of the sprocket unit in an internal combustion engine, to which the chain cover is attached.

In accordance with one aspect of the present disclosure, an installing structure for an electric variable valve timing apparatus is provided. The electric variable valve timing apparatus includes a sprocket unit, which is attached to a camshaft of an internal combustion engine, and an electric motor, which is coupled to the sprocket unit. The sprocket unit includes a first rotor, which is fixed to one end of the camshaft, a second rotor, which surrounds a circumference of the first rotor, a sprocket, which is provided integrally with an outer periphery of the second rotor, and a varying mechanism. A timing chain of the internal combustion engine is looped over the sprocket. The varying mechanism is provided between the first rotor and the second rotor to couple the first rotor and the second rotor while allowing the rotors to rotate relative to each other. The electric motor is fixed to a chain cover, which covers the timing chain, with bolts and is coupled to the varying mechanism to actuate the varying mechanism. The chain cover includes a plurality of bosses each having an internal thread to which one of the bolts is threaded. The bosses extend from the chain cover toward the sprocket unit to positions at which the bosses face an outer periphery of the sprocket unit in a radial direction. The bosses are arranged such that, when the sprocket unit moves vertically downward from an attaching position, at which the sprocket unit is attached to the camshaft, at least two bosses are engaged with the sprocket unit to restrict vertically downward movement of the sprocket unit, and that the sprocket unit is allowed to move between a location outside of a space covered by the chain cover and the attaching position.

In accordance with another aspect of the present disclosure, an internal combustion engine is provided that includes an engine body including a camshaft and a timing chain, a chain cover, and an electric variable valve timing apparatus. The chain cover defines an accommodation space and an access opening for exposing the accommodation space to an outside. The electric variable valve timing apparatus includes a sprocket unit, which is arranged in the accommodation space and attached to the camshaft, and an electric motor, which is coupled to the sprocket unit. The sprocket unit includes a first rotor, which is fixed to one end of the camshaft, a second rotor, which surrounds a circumference of the first rotor, a sprocket, which is provided integrally with an outer periphery of the second rotor, and a varying mechanism. The timing chain is looped over the sprocket. The varying mechanism is provided between the first rotor and the second rotor to couple the first rotor and the second rotor while allowing the rotors to rotate relative to each other. The electric motor is fixed to the chain cover with bolts and is coupled to the varying mechanism to actuate the varying mechanism. The chain cover includes a plurality of bosses each having an internal thread to which one of the bolts is threaded. The bosses extend from the chain cover toward the sprocket unit to positions at which the bosses face an outer periphery of the sprocket unit in a radial direction. The bosses are arranged such that, when the sprocket unit moves vertically downward from an attaching position, at which the sprocket unit is attached to the camshaft, at least two bosses are engaged with the sprocket unit to restrict vertically downward movement of the sprocket unit, and that the sprocket unit is allowed to move between a location outside of the accommodation space and the attaching position through the access opening.

Other aspects and advantages of the present disclosure will become apparent from the following description, taken in conjunction with the accompanying drawings, illustrating by way of example the principles of the disclosure.

BRIEF DESCRIPTION OF THE DRAWINGS

The disclosure may be understood by reference to the following description together with the accompanying drawings.

DETAILED DESCRIPTION

An installing structure for an electric variable valve timing apparatus according to one embodiment will now be described.

Figure 1:
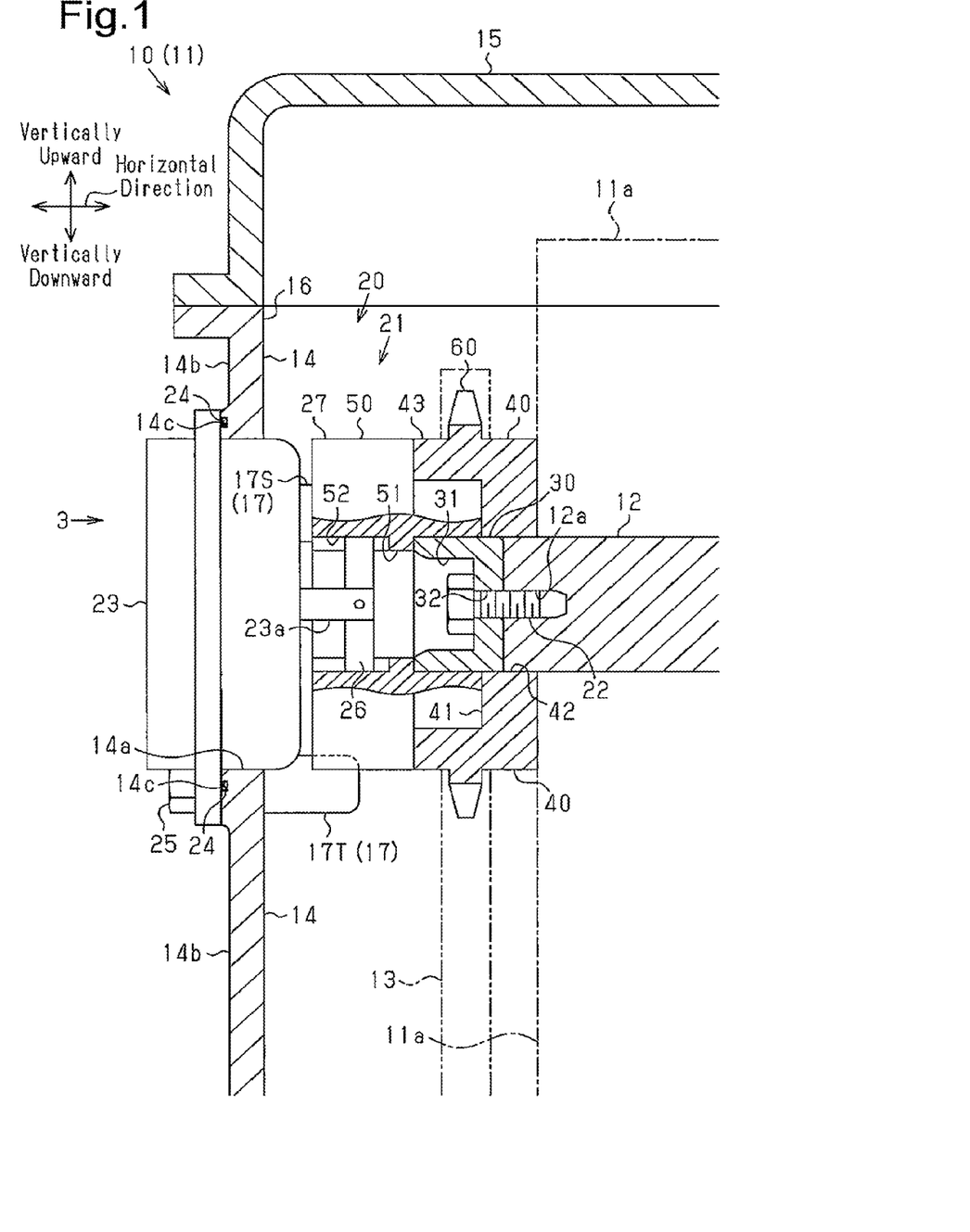
FIG. 1 is a partial cross-sectional view illustrating an installing structure for an electric variable valve timing apparatus according to one embodiment.

As shown in FIG. 1, a vehicle 10 includes an internal combustion engine 11 serving as a drive source. The internal combustion engine 11 includes an engine body 11a, which includes a cylinder head and a cylinder block. A camshaft 12 for opening and closing engine valves is provided in the engine body 11a. The internal combustion engine 11 includes an electric variable valve timing apparatus 20. A timing chain 13 is operably coupled to the camshaft 12 via the variable valve timing apparatus 20. A chain cover 14 and a cylinder head cover 15 are attached to the engine body 11a. The chain cover 14 covers the part in which the timing chain 13 is arranged. The cylinder head cover 15 serves as a covering member that covers the upper part of the engine body 11a. The chain cover 14 has an access opening 16, which opens vertically upward. The cylinder head cover 15 is attached to the engine body 11a to cover the access opening 16. When the cylinder head cover 15 is removed from the engine 11, the space covered by the chain cover 14, that is, an accommodation space for the chain cover 14, is exposed to the outside.

Figure 2:
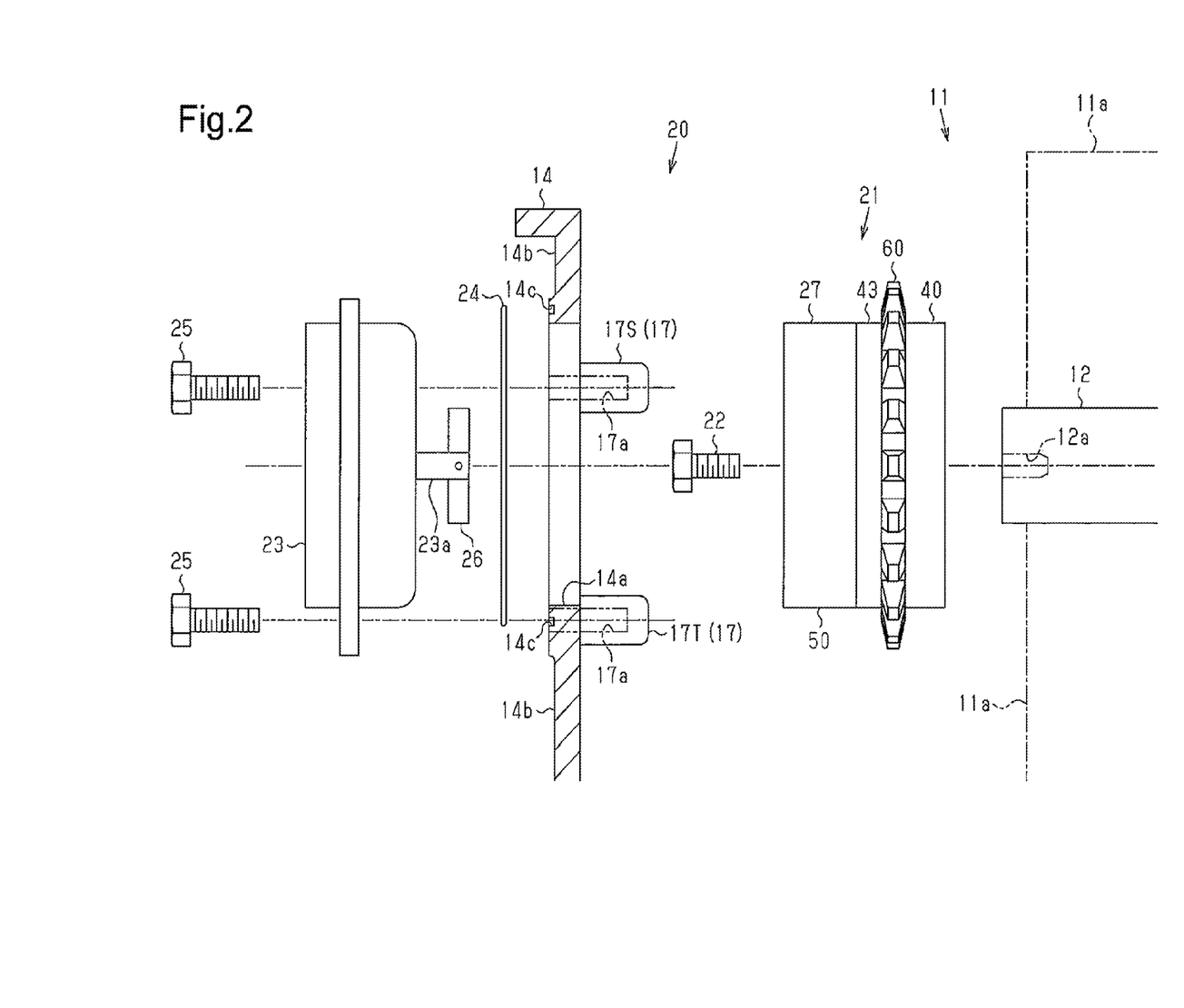
FIG. 2 is an exploded view illustrating the installing structure for a variable valve timing apparatus.
Figure 3:
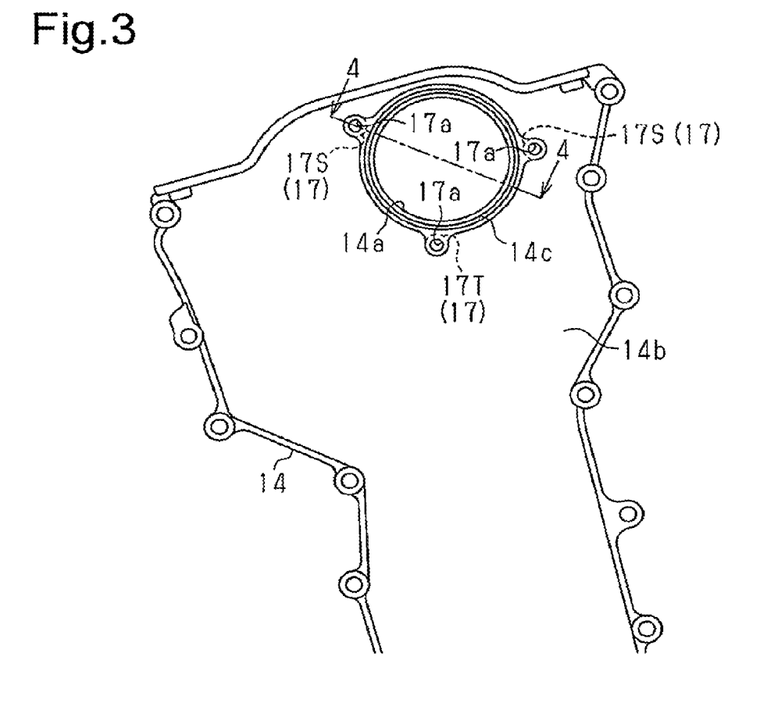
FIG. 3 is a side view illustrating the chain cover as viewed in the direction of arrow 3 in FIG. 1.
Figure 4:
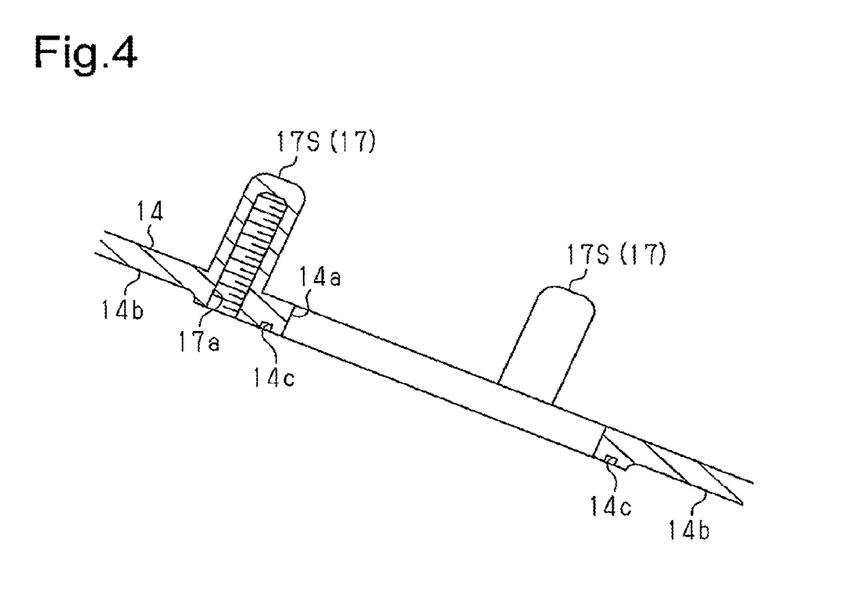
FIG. 4 is a cross-sectional view taken along line 4-4 of FIG. 3.

As shown in FIGS. 1 and 2, the variable valve timing apparatus 20 includes a sprocket unit 21, which is configured to transmit rotation of the crankshaft of the engine 11 to the camshaft 12. The sprocket unit 21 is configured by a first rotor 30, a second rotor 40, a varying mechanism 50, and a sprocket 60.

The first rotor 30 has a cylindrical shape with a bottom 31. The bottom 31 of the first rotor 30 has a through-hole 32. A fixing bolt 22 is inserted in the through-hole 32 of the first rotor 30 and threaded to an internal thread 12a in the distal end of the camshaft 12 of the engine 11. This fastens the first rotor 30 to one end of the camshaft 12 so that the central axis of the first rotor 30 agrees with the rotation axis of the camshaft 12.

The second rotor 40 has a shape surrounding the first rotor 30. Specifically, the second rotor 40 has a cylindrical shape with a bottom 41. The bottom 41 of the second rotor 40 has a through-hole 42, which extends along the central axis of the second rotor 40 and has a circular cross-sectional shape. The first rotor 30 is fixed to the camshaft 12 while being inserted in the through-hole 42 of the second rotor 40. Accordingly, the first rotor 30 is arranged inside the second rotor 40 such that the central axis of the second rotor 40 agrees with the rotation axis of the first rotor 30.

The second rotor 40 has an outer periphery 43, with which the sprocket 60 is integrated. The timing chain 13 (FIG. 1) is looped over the sprocket 60. The crankshaft of the engine 11 is coupled to the second rotor 40 via the timing chain 13 and the sprocket 60.

The varying mechanism 50 is arranged between the first rotor 30 and the second rotor 40. The varying mechanism 50 incorporates a gear mechanism and a link mechanism (neither is shown) and uses these mechanisms to couple the first rotor 30 and the second rotor 40 to each other such that the rotors 30, 40 are allowed to rotate relative to each other. The varying mechanism 50 has a through-hole 51, which extends along the rotation axis. When the sprocket unit 21 (specifically, the first rotor 30) is attached to the camshaft 12, the bolt 22 is inserted in the through-hole 32 of the first rotor 30 via the through-hole 51 of the varying mechanism 50 and is threaded to the internal thread 12a of the camshaft 12. When the sprocket unit 21 is removed from the camshaft 12, the bolt 22 is removed from the internal thread 12a of the camshaft 12 via the through-hole 51 of the varying mechanism 50 and the interior of the first rotor 30.

The variable valve timing apparatus 20 includes an electric motor 23 for actuating the varying mechanism 50.

The chain cover 14 has a through-hole 14a, in which the electric motor 23 is inserted. The electric motor 23 is attached to the chain cover 14 while being inserted in the through hole 14a. The chain cover 14 has an annular groove 14c on an outer surface 14b (the left-side surface as viewed in FIG. 1). Specifically, the annular groove 14c is arranged in the periphery of the through-hole 14a to surround the circumference of the through-hole 14a. The annular groove 14c receives an O-ring 24 for sealing the clearance between the electric motor 23 and the outer surface 14b of the chain cover 14. The chain cover 14 further includes three bosses 17 (only two are shown in FIGS. 1 and 2) located around the annular groove 14c. Each boss 17 has an internal thread 17a. A bolt 25 is threaded from the outer surface 14b of the chain cover 14 into the internal thread 17a of each boss 17. The three bosses 17 extend from the chain cover 14 toward the sprocket unit 21 to positions that face the outer periphery 27 of the sprocket unit 21 in the radial direction.

The electric motor 23 is attached to the chain cover 14 in the following manner. First, the O-ring 24 is attached to the annular groove 14c, and the electric motor 23 is inserted in the through-hole 14a. Thereafter, with a part of the case of the electric motor 23 held between the head of each bolt 25 and the chain cover 14, the bolts 25 are respectively threaded to the internal threads 17a of the three bosses 17. This fixes the electric motor 23 to the chain cover 14, and the O-ring 24 is held between the outer surface 14b of the chain cover 14 and the electric motor 23 to seal the clearance in between.

The varying mechanism 50 has a keyway 52, which is formed in the inner surface of the through-hole 51 and extends along the axis of the varying mechanism 50 (in the lateral direction as viewed in FIG. 1). Also, a key piece 26 is attached to an output shaft 23a of the electric motor 23. The key piece 26 extends in a direction perpendicular to the axis of the output shaft 23a. The electric motor 23 is attached to the chain cover 14 with the key piece 26 of the electric motor 23 engaged with the keyway 52 of the varying mechanism 50. This couples the output shaft 23a of the electric motor 23 with the varying mechanism 50 such that the output shaft 23a and the varying mechanism 50 rotate integrally.

The variable valve timing apparatus 20 is actuated in the following manner.

When, through control of the electric motor 23, the rotation speed of the output shaft 23a of the electric motor 23 (electric motor rotation speed) agrees with the rotation speed of the second rotor 40 (rotor rotation speed), over which the timing chain 13 (FIG. 1) is looped, the varying mechanism 50 is not actuated. In this state, the relative rotational angle between the first rotor 30 and the second rotor 40 does not change. Therefore, the relative rotational angle between the camshaft 12, which is fixed to the first rotor 30, and the crankshaft of the engine 11, which is coupled to the second rotor 40, is not changed, so that the valve timing remains unchanged.

In contrast, when, through actuation control of the electric motor 23, the electric motor rotation speed and the rotor rotation speed are differentiated, the varying mechanism 50 is actuated such that the relative rotational angle between the first rotor 30 and the second rotor 40 is changed. In this case, the relative rotational angle between the internal combustion engine 11 and the camshaft 12 is changed, so that the valve timing is varied. For example, when the electric motor rotation speed is made faster than the rotor rotation speed, the valve timing is advanced. In contrast, when the electric motor rotation speed is made slower than the rotor rotation speed, the valve timing is retarded.

For example, at replacement of the variable valve timing apparatus 20 shown in FIG. 1, an operation for removing the sprocket unit 21 from the camshaft 12 (hereinafter, referred to as a removing operation of the sprocket unit 21) or an operation for attaching the sprocket unit 21 to the camshaft 12 (hereinafter, referred to as an attaching operation of the sprocket unit 21) may be performed with the chain cover 14 remaining attached to the internal combustion engine 11 mounted in the vehicle 10.

The removing operation of the sprocket unit 21 is performed in the following manner. First, the cylinder head cover 15 is removed from the engine body 11a (specifically, the cylinder head), and the electric motor 23 is removed from the chain cover 14. Then, the chain tensioner (not shown) is manipulated to loosen the timing chain 13.

Thereafter, the timing chain 13 is removed from the sprocket 60. Then, the worker inserts one hand into the space covered by the chain cover 14 (the accommodation space) via the access opening 16. While holding the sprocket unit 21 with that hand, the worker inserts a tool into the first rotor 30 with the other hand via the through-hole 14a of the chain cover 14 and the through-hole 51 of the varying mechanism 50 to remove the bolt 22 from the internal thread 12a of the camshaft 12. Thereafter, the worker takes out the sprocket unit 21 from the accommodation space via the outlet 16.

The attaching operation of the sprocket unit 21 is performed in the following manner. The worker first holds the sprocket unit 21 in one hand and inserts it into the accommodation space via the access opening 16 and holds the sprocket unit 21 at a predetermined attaching position. While holding the sprocket unit 21 with that hand, the worker uses the tool with the other hand to thread the bolt 22 to the internal thread 12a of the camshaft 12 via the through-hole 51 of the varying mechanism and the interior of the first rotor 30.

Thereafter, the timing chain 13 is looped over the sprocket 60. Then, the chain tensioner is manipulated to apply appropriate tension to the timing chain 13. Subsequently, the electric motor 23 is fixed to the chain cover 14, and the cylinder head cover 15 is attached to the engine 11.

In the present embodiment, the sprocket unit 21 is arranged in the space covered by the chain cover 14. Thus, as described above, when the removing operation or the attaching operation of the sprocket unit 21 is performed with the engine 11 mounted in the vehicle 10, that operation must be performed in the narrow space covered by the chain cover 14. Therefore, the worker may inadvertently drop the sprocket unit 21 into the space covered by the chain cover 14.

Taking such circumstances into consideration, the variable valve timing apparatus 20 has a structure in which the bosses 17, which are configured to fix the electric motor 23, are employed to restrain falling of the sprocket unit 21 into the space covered by the chain cover 14 during the removing operation or the attaching operation of the sprocket unit 21.

The arrangement of the bosses 17 will now be described.

As shown in FIGS. 1 to 4, the three bosses 17 are arranged in the outer periphery 27 of the sprocket unit 21 (FIG. 1). The three bosses 17 extend from the chain cover 14 toward the sprocket unit 21 to positions that face the outer periphery 27 of the sprocket unit 21. Each boss 17 has a columnar shape that extends coaxially with the internal thread 17a.

Figure 5:
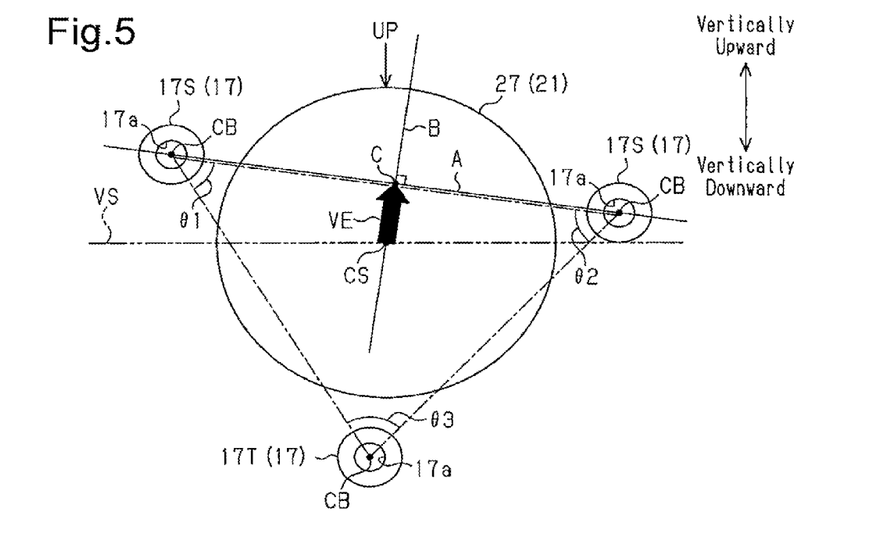
FIG. 5 is a schematic diagram showing a positional relationship between the outer periphery of the sprocket unit and three bosses.
Figure 6:
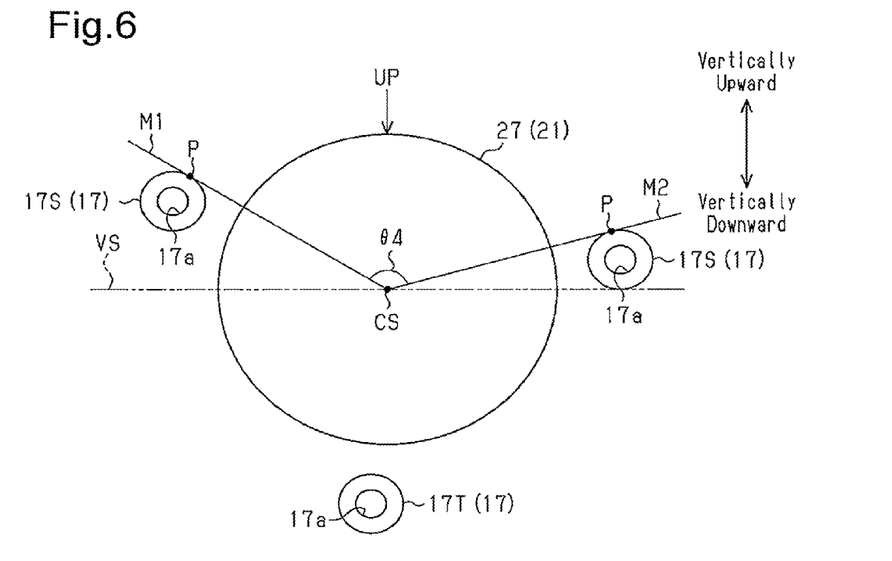
FIG. 6 is a schematic diagram showing a positional relationship between the outer periphery of the sprocket unit and three bosses.
Figure 7:
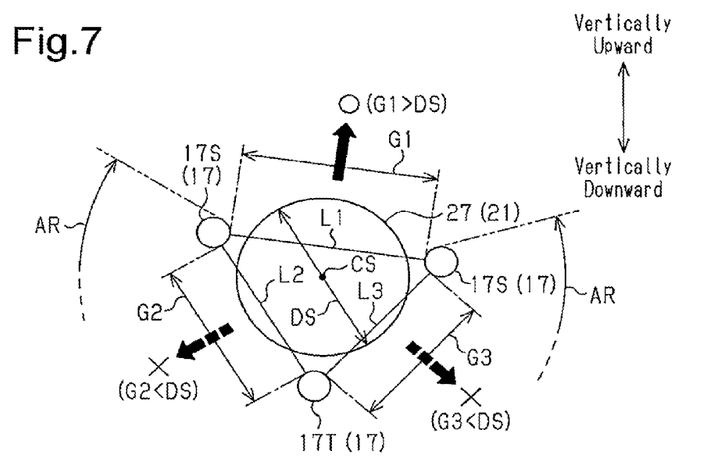
FIG. 7 is a schematic diagram showing a positional relationship between the outer periphery of the sprocket unit and three bosses.

FIGS. 5 to 7 show the positional relationship between the outer periphery 27 of the sprocket unit 21 and the three bosses 17.

In FIG. 5, the vertically uppermost part of the outer periphery 27 of the sprocket unit 21 is indicated by UP. Hereinafter, among the three bosses 17, two bosses 17 that are adjacent to each other and located on the opposite sides of the vertically uppermost part UP are defined as first bosses 17S, and the other boss 17 is defined as a second boss 17T. The three bosses 17 are arranged at positions that meet all of the following conditions 1 to 9.

Condition 1: The two first bosses 17S are each entirely located vertically above (as viewed in FIG. 5) a horizontal plane VS, which includes the rotation center CS of the sprocket unit 21.

Condition 2: The straight line connecting the centers CB of the internal threads 17a of the two first bosses 17S is defined as an imaginary line A, and the straight line including the rotation center CS of the sprocket unit 21 and perpendicular to the imaginary line A is defined as an imaginary line B. A vector is defined that extends from the rotation center CS of the sprocket unit 21 toward the intersection C of the imaginary line A and the imaginary line B (arrow VE in FIG. 5). The two first bosses 17S are arranged such that the vector has a vertically upward component.

Condition 3: The second boss 17T is arranged vertically below the imaginary line A.

Condition 4: A triangle is defined the vertices of which coincide with the centers CB of the internal threads 17a of the three bosses 17. The bosses 17 are arranged at positions where the inner angles (θ1, θ2, θ3 in FIG. 5) of the triangle are all acute angles.

Condition 5: As shown FIG. 6, two tangents that include the rotation center CS of the sprocket unit 21 and contact vertically upper parts of the two first bosses 17S are defined as M1 and M2, respectively. In this case, the angle θ4 defined by the two tangents M1, M2 on the side corresponding to the vertically uppermost part UP is less than 180°. The tangents M1, M2 are lines that contact the outer shapes of the first bosses 17S as viewed in the direction of the rotation axis of the sprocket unit 21, or the outer circumferential surfaces of the first bosses 17S.

Condition 6: The second boss 17T is located vertically below the line segment that connects the two contact points P of the two tangents M1, M2 with the two first bosses 17S.

Condition 7: The two first bosses 17S and the contact points P are both vertically above the horizontal plane VS, which includes the rotation center CS of the sprocket unit 21.

Condition 8: As shown in FIG. 7, the line segments that connect adjacent pairs of bosses 17 along the outer periphery 27 of the sprocket unit 21 by the shortest distances are defined as line segments L1 to L3. Among the three line segments L1 to L3, the line segment L1, which connects the two first bosses 17S, is longer than the maximum diameter of the part of the outer periphery 27 of the sprocket unit 21 that is radially inside the three bosses 17 (the diameter DS of the outer periphery 27). That is, the distance between the two first bosses 17S (the distance indicated by arrow G1 in FIG. 7) is greater than the diameter DS.

Condition 9: The line segment L2, which corresponds to the shortest distance between one of the first bosses 17S and the second boss 17T, and the line segment L3, which corresponds to the shortest distance between the other first boss 17S and the second boss 17T, are shorter than the diameter DS. That is, the distance between each first boss 17S and the second boss 17T (indicated by arrows G2, G3 in FIG. 7) is shorter than the diameter DS.

Since the three bosses 17 have columnar shapes extending coaxially with the internal threads 17a, the bosses 17 automatically meet the conditions 5 and 6 if they meet the conditions 2 and 3. Likewise, since the three bosses 17 have columnar shapes extending coaxially with the internal threads 17a, the bosses 17 automatically meet the condition 7 if they meet the condition 1.

With the above described arrangement of the three bosses 17, the present embodiment operates in the following manner and thus achieves advantages discussed below.

As obvious from FIG. 7, in the removing operation or the attaching operation of the sprocket unit 21, if the sprocket unit 21 falls and moves vertically downward from the attaching position (the position shown in FIG. 7), the sprocket unit 21 contacts some of the three bosses 17. At this time, the sprocket unit 21 acts to enter either the space between one of the first bosses 17S and the second boss 17T or the space between the other first boss 17S and the second boss 17T.

In the present embodiment, the distance G2 between one of the first bosses 17S and the second boss 17T and the distance G3 between the other first boss 17S and the second boss 17T are shorter than the maximum diameter of the part of the outer periphery 27 of the sprocket unit 21 that is radially inside the three bosses 17 (the diameter DS of the outer periphery 27). That is, the distances G2, G3 between the bosses 17, which contact the sprocket unit 21 when the sprocket unit 21 moves vertically downward, are narrow such that the sprocket unit 21 cannot pass through. Therefore, even if the sprocket unit 21 moves vertically downward from the attaching position, the sprocket unit 21 does not pass through the spaces between the first bosses 17S and the second boss 17T, but engages one of the first bosses 17S and the second boss 17T. As described above, in the present embodiment, the three bosses 17 are arranged at positions to engage the sprocket unit 21 when the sprocket unit 21 moves vertically downward from the attaching position.

Therefore, when the removing operation or the attaching operation of the sprocket unit 21 is performed in the engine 11 in the vehicle 10 with the chain cover 14 remaining attached, even if the worker inadvertently drops the sprocket unit 21, the sprocket unit 21 is restricted from moving vertically downward by engaging with two of the three bosses 17.

The two first bosses 17S are arranged such that the vector VE, which extends from the rotation center CS of the sprocket unit 21 toward the intersection C of the imaginary line A and the imaginary line B, has a vertically upward component. The second boss 17T is arranged vertically below the horizontal plane VS. From a different standpoint, the two first bosses 17S are arranged such that the angle θ4, which is defined by the tangents M1, M2 (see FIG. 6) including the rotation center CS of the sprocket unit 21 on the side corresponding to the vertically uppermost part UP, is less than 180°. The second boss 17T is arranged vertically below the line segment that connects the two contact points P of the two tangents M1, M2 with the two first bosses 17S.

Thus, as obvious from FIG. 7, the three bosses 17 can be arranged in a range greater than half the circumference of the outer periphery 27 of the sprocket unit 21 (the range indicated by arrows AR) so that the sprocket unit 21 does not pass through the spaces between an adjacent pair of the three bosses 17. This expands the range around the sprocket unit 21 in which the sprocket unit 21 engages with the bosses 17 when the sprocket unit 21 moves vertically downward from the attaching position.

In the structure in which three bosses 17 are arranged along the outer periphery 27 of the sprocket unit 21 as in the present embodiment, if one of the distances G1 to G3 between the bosses 17 were significantly greater than the other distances, the arrangement of the bosses 17 would be uneven, that is, the three bosses 17 would be concentrated on the vertically lower side of the outer periphery 27, for example. Such an uneven arrangement of the bosses 17 may narrow the range about the sprocket unit 21 in which the sprocket unit 21 can engage with the bosses 17.

If increasing one of the distances G1 to G3 of the three bosses 17 compared to the other distances would increase one of the inner angles of the triangle the vertices of which coincide with the centers CB of the internal threads 17a of the three bosses 17. If the three bosses 17 were arranged such that one of the inner angles of the triangle is an obtuse angle, the bosses 17 would be highly likely to be arranged in a range smaller than the semicircle of the circumference of the outer periphery 27 of the sprocket unit 21.

In this respect, the present embodiment has a structure in which, when a triangle is defined the vertices of which coincide with the centers CB of the internal threads 17a of the three bosses 17, the bosses 17 are arranged at positions such that the inner angles θ1, θ2, θ3 (see FIG. 5) of the triangle are all acute angles. Thus, the bosses 17 are arranged about the sprocket unit 21 in a well-balanced manner, while avoiding an uneven arrangement of the bosses 17. Therefore, without providing four or more bosses, only the three bosses 17 achieve the structure in which, when the sprocket unit 21 moves vertically downward from the attaching position, the range AR, in which the sprocket unit 21 can engage with the bosses 17 (see FIG. 7), is enlarged to reliably prevent the sprocket unit 21 from falling.

Also, in the present embodiment, the three bosses 17, which are used to fix the electric motor 23, are arranged about the through hole 14a of the chain cover 14, in which the electric motor 23 is inserted, in a well-balanced manner without unevenly arranging the bosses 17. Thus, the positions of the three bosses 17, that is, the three fixing positions at which the electric motor 23 is fixed with bolts, are prevented from being concentrated on one side about the electric motor 23. Therefore, compared to a structure in which the fixing positions of the electric motor 23 are concentrated on one side about the electric motor 23, the electric motor 23 is fixed to the chain cover 14 in a stable manner.

To allow the O-ring 24 to properly exert the sealing performance, the surface pressure of the contacting chain cover 14 and the electric motor 23 acting on the O-ring 24 is preferably uniform in the circumferential direction. In the present embodiment, the three fixing positions of the electric motor 23 are arranged about the electric motor 23 in a well-balanced manner, so that the electric motor 23 is fixed stably. This restrains variation in the surface pressure in the circumferential direction of the O-ring 24, thereby allowing the O-ring 24 to properly exert the sealing performance.

Further, the two first bosses 17S are entirely located vertically above the horizontal plane VS (see FIG. 5), which includes the rotation center CS of the sprocket unit 21. Thus, compared to a structure in which one of the two first boss 17S is located vertically below the horizontal plane VS, the sprocket unit 21 is less likely to fall vertically downward over the first bosses 17S. This reliably restrains falling of the sprocket unit 21.

Also, among the three bosses 17, the distance G1 between the two first boss 17S is greater than the diameter DS of the part of the outer periphery 27 of the sprocket unit 21 that is radially inside the three bosses 17. Accordingly, the distance G1 between the two first bosses 17S is great enough to allow the sprocket unit 21 to pass through. Thus, although the three bosses 17 are arranged to prevent the sprocket unit 21 from falling, the sprocket unit 21 can be moved through the space between the two first bosses 17S without being blocked by the bosses 17, so that the sprocket unit 21 can be removed from the camshaft 12 or attached to the camshaft 12. In this manner, the three bosses 17 are arranged such that the sprocket unit 21 is allowed to move between the outside of the space covered by the chain cover 14 and the attaching position of the sprocket unit 21 (the position shown in FIG. 7).

Figure 8:
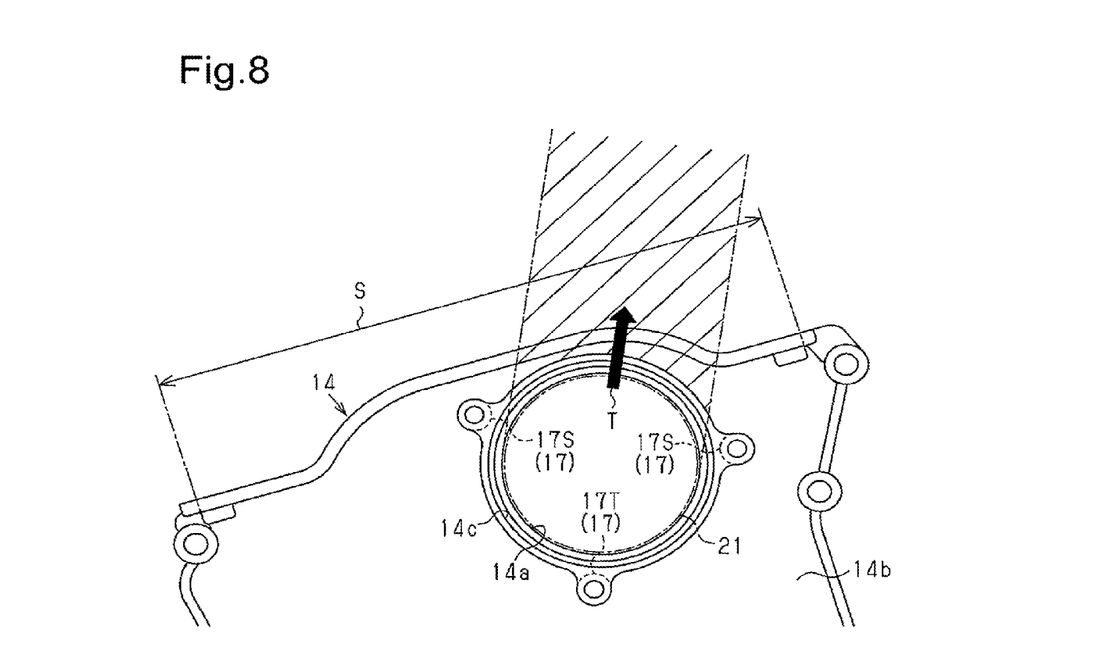
FIG. 8 is a side view showing the chain cover and the relationship between a movement path of the sprocket unit and an access opening.

When the cylinder head cover 15 is removed from the engine 11, the space covered by the chain cover 14 (the accommodation space) is exposed to the outside via the access opening 16. Also, as shown in FIG. 8, when the sprocket unit 21 is moved linearly from the attaching position (the position shown in FIG. 8) toward the access opening 16 through between the two first bosses 17S (the direction indicated by arrow T in the drawing), the movement path of the sprocket unit 21 (the cross-hatched section in the drawing) does not overlap with the chain cover 14. Arrow S in FIG. 8 indicates the range of the opening of the access opening 16 vertically above the chain cover 14.

With the above described structure, when the sprocket unit 21 is moved in the direction T after the bolts (see FIG. 1) are removed to free the sprocket unit 21 from the camshaft 12, the sprocket unit 21 can be taken out from the accommodation space via the access opening 16 without interfering with the chain cover 14. By moving the sprocket unit 21 in a direction opposite to the direction in which the sprocket unit 21 is taken out through between the first bosses 17S, the sprocket unit 21 can be moved into the accommodation space from the outside and to the attaching position, while avoiding interference with the chain cover 14.

As described above, the present embodiment achieves the following advantages.

(1) The three bosses 17 are arranged such that, when the sprocket unit 21 is moved vertically downward from the attaching position, at least two bosses 17 engage with the sprocket unit 21 to restrict vertically downward movement of the sprocket unit 21. Also, the three bosses 17 are arranged to permit the sprocket unit 21 to move between a location outside the space covered by the chain cover 14 and the attaching position of the sprocket unit 21. Therefore, at the attaching operation and the removing operation of the sprocket unit 21 in the internal combustion engine 11, to which the chain cover 14 mounted in the vehicle 10 is attached, the bosses 17 for fixing the electric motor 23 are used to restrain falling of the sprocket unit 21 into the space covered by the chain cover 14.

(2) When moving vertically downward from the attaching position, the sprocket unit 21 contacts the three bosses 17, which are arranged at the distances G2, G3, and the distances G2, G3 are narrow to prevent the sprocket unit 21 from passing through. Thus, the sprocket unit 21 engages with two of the bosses 17 to be prevented from falling. The distance G1 between the two first bosses 17S is sufficiently great to allow the sprocket unit 21 to pass through. Thus, through the space between the first bosses 17S, the sprocket unit 21 can be removed from the camshaft 12 or attached to the camshaft 12. Further, the three bosses 17 can be arranged in a range greater than half the circumference of the outer periphery 27 of the sprocket unit 21 so that the sprocket unit 21 does not pass through the spaces of the distances G2, G3 between the bosses 17. This favorably restrains falling of the sprocket unit 21.

(3) A triangle is defined the vertices of which coincide with the centers CB of the internal threads 17a of the three bosses 17. The bosses 17 are arranged at positions where the inner angles $\theta_1$, $\theta_2$, $\theta_3$ of the triangle are all acute angles. Therefore, without providing four or more bosses, only the three bosses 17 achieve the structure in which, when the sprocket unit 21 moves vertically downward from the attaching position, the range in which the sprocket unit 21 can engage with the bosses 17 is enlarged to reliably prevent the sprocket unit 21 from falling. Also, the three fixing positions of the electric motor 23 are arranged about the electric motor 23 in a well-balanced manner, so that the electric motor 23 is fixed stably. This restrains variation in the surface pressure in the circumferential direction of the O-ring 24, thereby allowing the O-ring 24 to properly exert the sealing performance.

(4) The two first bosses 17S are entirely located vertically above the horizontal plane VS, which includes the rotation center CS of the second rotor 40. Thus, compared to a structure in which one of the two first boss 17S is located vertically below the horizontal plane VS, the sprocket unit 21 is less likely to fall vertically downward over the first bosses 17S. This reliably restrains falling of the sprocket unit 21.

(5) The chain cover 14 defines the access opening 16 for removing the sprocket unit 21 from the space covered by the chain cover 14. When the cylinder head cover 15 is removed from the engine 11, the space covered by the chain cover 14 is exposed to the outside via the access opening 16. With the cylinder head cover 15 removed, the chain cover 14 does not overlap with the movement path of the sprocket unit 21 does not overlap with the chain cover 14 when the sprocket unit 21 is moved in the direction T from the attaching position through between the two first bosses 17S. Thus, when the sprocket unit 21 is moved linearly in the direction T after the bolts 22 are removed to free the sprocket unit 21 from the camshaft 12, the sprocket unit 21 can be taken out from the space covered by the chain cover 14 via the access opening 16 without interfering with the chain cover 14. By linearly moving the sprocket unit 21 in a direction opposite from the direction T, the sprocket unit 21 is moved from outside the space covered by the chain cover 14 to the attaching position in the space, while avoiding interference with the chain cover 14, so that the sprocket unit 21 is placed at the attaching position.

The above illustrated embodiment may be modified as follows.

As long as the sprocket unit 21, which has been detached from the camshaft 12, can be taken out of the space covered by the chain cover 14, a structure may be employed in which, when the sprocket unit 21 is moved in the direction T from the attaching position through between the two first bosses 17S, the movement path of the sprocket unit 21 overlaps with the chain cover 14. In this case, the moving direction of the sprocket unit 21 must be altered in the space covered by the chain cover 14. Nevertheless, this installing structure allows the sprocket unit 21 to be taken out of the space covered by the chain cover 14 in the removing operation and is capable of guiding the sprocket unit 21 to the attaching position in the space covered by the chain cover 14 in the attaching operation.

Figure 9:
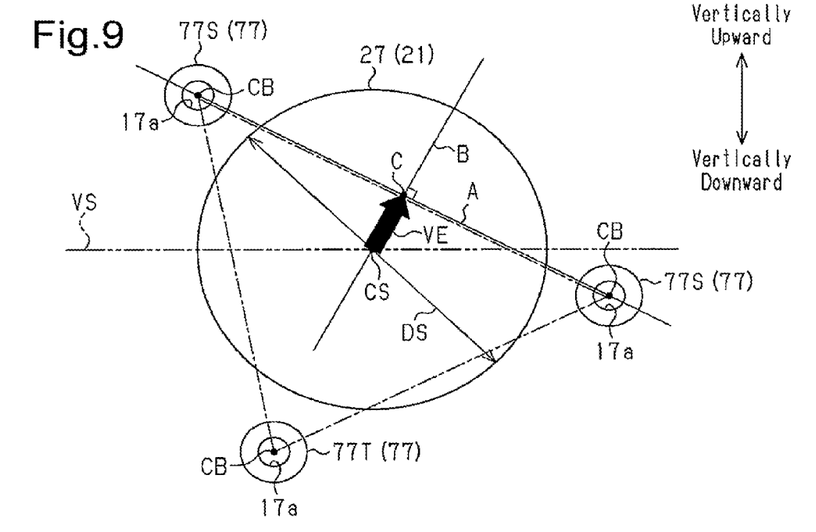
FIG. 9 is a schematic diagram showing a positional relationship between the outer periphery of a sprocket unit and three bosses in another embodiment.

As shown in FIG. 9, one of two first bosses 77S may be located vertically below the horizontal plane VS, which includes the rotation center CS of the sprocket unit 21. Even with such an installing structure, if the conditions 4 to 6, 8, and 9 are all met, the advantages (1) to (3) are achieved. If the bosses 77 have columnar shape extending coaxially with the internal threads 17a, the conditions 5 and 6 are automatically met if the conditions 2 and 3 are met. Thus, if the bosses 77 have columnar shape extending coaxially with the internal threads 17a, the advantages (1) to (3) are achieved as long as the conditions 2 to 4, 8, and 9 are all met. In this case, in each of the conditions and the advantages (1) to (3), "three bosses 17,", "first bosses 17S," and "second boss 17T" are deemed to be replaced with "three bosses 77," "first bosses 77S," and "second boss 77T," respectively.

When a triangle is defined the vertices of which coincide with the centers CB of the internal threads 17a of the three bosses 17, not all the inner angles need to be acute angles, but one of the inner angles may be an obtuse angle. Even with such an installing structure, the above described advantage (1) is achieved.

When one of the inner angles of the triangle the vertices of which coincide with the centers CB of the internal threads 17a of the bosses is an obtuse angle, the three bosses may be arranged vertically below the horizontal plane VS if the condition 9 and conditions 10, 11, which are listed below, are met.

Condition 10: The two bosses at the vertices where the inner angles of the triangle are acute angles are defined as first bosses, and the first bosses are arranged on opposite sides of a vertical plane, which includes the rotation axis of the sprocket unit 21.

Condition 11: The boss at the vertex where the inner angle of the triangle is an obtuse angle is defined as a second boss, and the second boss is located vertically below an imaginary line A, which connects the centers of the internal threads of the two first bosses.

In such an installing structure, the vertical plane that includes the rotation axis of the sprocket unit 21 is located between the two first bosses. The center of gravity of the sprocket unit 21 is located on the rotation axis of the sprocket unit 21. Thus, when the sprocket unit 21 falls from the attaching position, gravity acts to cause the sprocket unit 21 to move through between the two first bosses. In this installing structure, the distance between one of the first bosses and the second boss and the distance between the other first boss and the second boss are shorter than the diameter DS of the part of the outer periphery 27 of the sprocket unit 21 that is radially inside the three bosses. Thus, the distances are narrow such that the sprocket unit 21 cannot pass through. Therefore, when the sprocket unit 21 falls from the attaching position, at least two of the three bosses and the sprocket unit 21 engage with each other, so that falling of the sprocket unit 21 is restrained. Also, by moving the sprocket unit 21 in a direction away from the three bosses (for example, vertically upward), the sprocket unit 21 can be moved and removed without being blocked by the bosses. Further, by moving the sprocket unit 21 toward the three bosses, the sprocket unit 21 can be guided to the attaching position without being blocked by the bosses.

Figure 10:
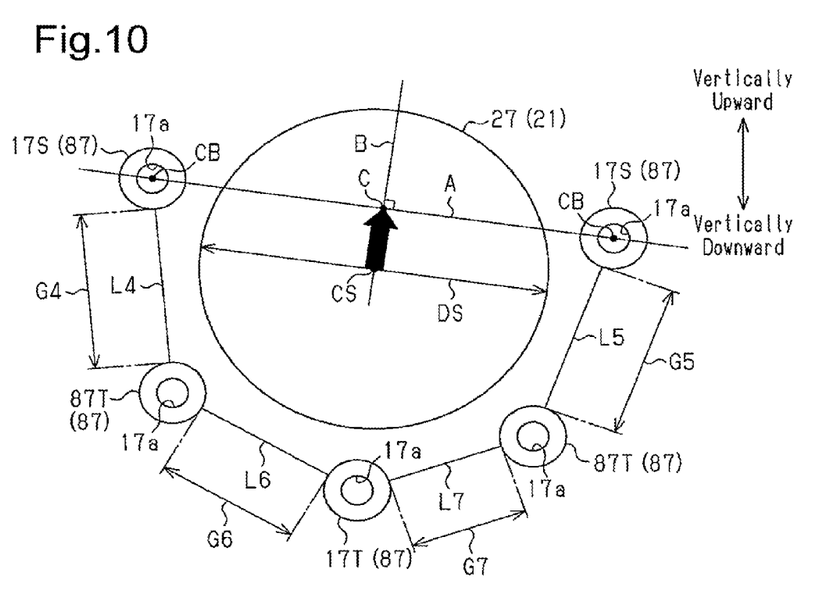
FIG. 10 is a schematic diagram showing a positional relationship between the outer periphery of a sprocket unit and a plurality of bosses in another embodiment.

In addition to the three bosses 17, bosses may be provided at any position that does not overlap with the movement path of the sprocket unit 21 during the removing operation or the attaching operation. For example, as shown in FIG. 10, an additional second boss 87T may be provided between each first boss 17S and the second boss 17T. In the example shown in FIG. 10, the two first bosses 17S and the second bosses 17T, 87T are arranged along the outer periphery 27 of the sprocket unit 21. Even with such an installing structure, if the conditions 12 to 15, which are listed below, are all met, the advantages (1) and (2) are achieved.

Condition 12: two first bosses 17S are arranged such that a vector VE is defined that extends from the rotation center CS of the sprocket unit 21 toward an intersection C of an imaginary line A (the straight line connecting the centers CB of the internal threads 17a of the two first bosses 17S) and an imaginary line B (the straight line that includes the rotation center CS of the sprocket unit 21 and is perpendicular to the imaginary line A), and that the vector VE has a vertically upward component.

Condition 13: The second bosses 17T, 87T are arranged vertically below the imaginary line A.

Condition 14: A line segment that connects the two first bosses 17S by the shortest distance (corresponding to the line segment L1 in FIG. 7), is longer than the diameter DS of the part of the outer periphery 27 of the sprocket unit 21 that is radially inside the five bosses 17. That is, the distance between the two first bosses 17S (corresponding to the distance G1 in FIG. 7) is greater than the diameter DS.

Condition 15: Line segments that connect adjacent pairs of bosses 87 along the outer periphery 27 of the sprocket unit 21 by the shortest distances are defined as line segments L4 to L7. Among the four line segments L4 to L7, the line segment L4 connects one of the first bosses 17S to one of the second bosses 87T. The line segment L5 connects the other first boss 17S to the second boss 87T. The line segments L6, L7 each connect the second bosses 17T, 87T together. The line segments L4 to L7 are shorter than the diameter DS. That is, among the distances between adjacent pairs of the bosses 87 along the outer periphery 27 of the sprocket unit 21, the distance G4 between one of the first bosses 17S and one of the second bosses 87T, the distance G5 between the other first boss 17S and the second boss 87T, and the distances G6, G7 between the second bosses 17T, 87T are shorter than the diameter DS.

Figure 11:
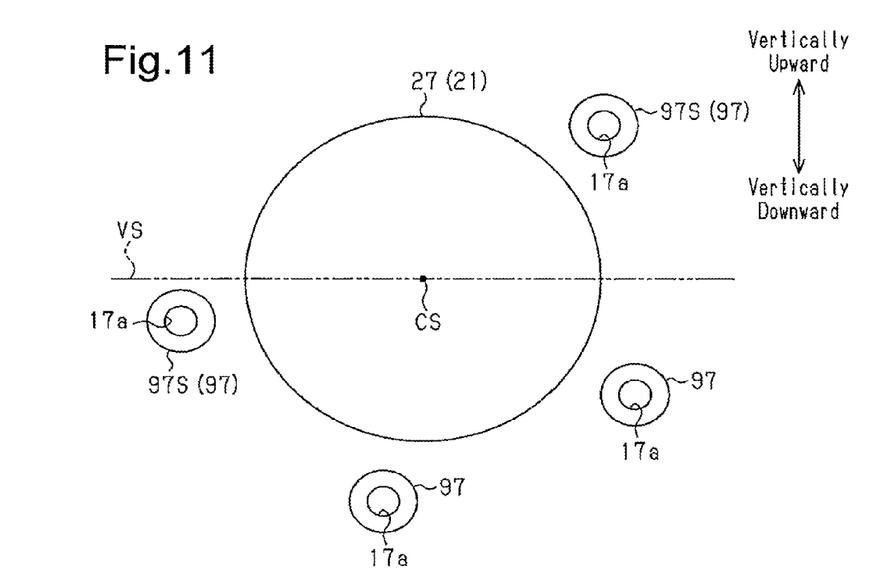
FIG. 11 is a schematic diagram showing a positional relationship between the outer periphery of a sprocket unit and a plurality of bosses in another embodiment.

FIG. 11 shows an example having four bosses 97. In this example, one of two first bosses 97S may be located vertically below the horizontal plane VS, which includes the rotation center CS of the sprocket unit 21. FIG. 11 illustrates a configuration with four bosses 97. In a configuration with four or more bosses 97, if the two first bosses 97S are both located vertically above the horizontal plane VS, the same advantage as the advantage (4) is achieved. In this case, "first bosses 17S" in the advantage (4) are deemed to be replaced with "first boss 97S."

Figure 12:
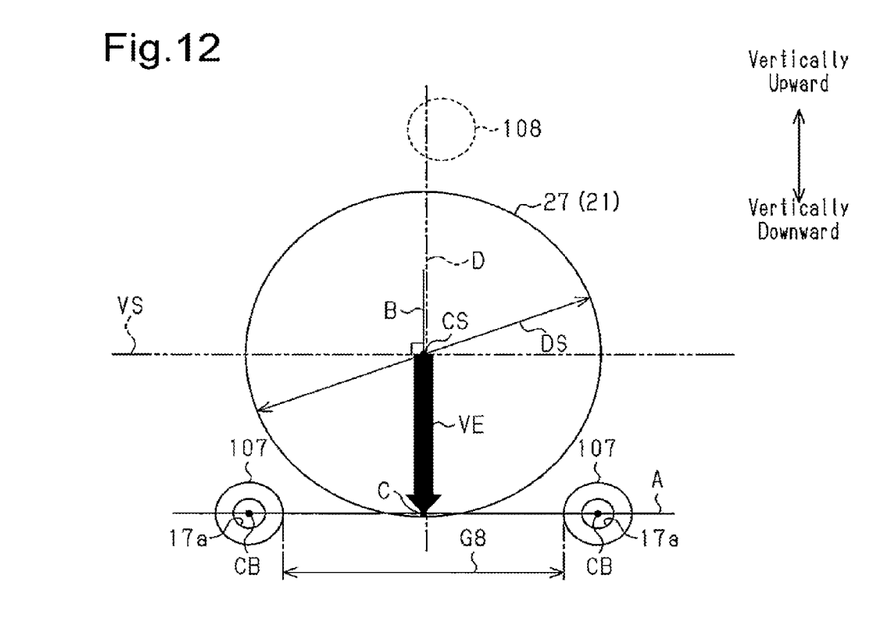
FIG. 12 is a schematic diagram showing a positional relationship between the outer periphery of a sprocket unit and two bosses in another embodiment.

The configuration shown in FIG. 12 may be employed, in which only two bosses 107 protrude to positions that face the outer periphery 27 of the sprocket unit 21 in the radial direction. In the example shown in FIG. 12, the two bosses 107 are arranged to meet all the following conditions 16 to 19.

Condition 16: The two bosses 107 are arranged on opposite sides of a vertical plane D, which includes the rotation axis of the sprocket unit 21.

Condition 17: The two bosses 107 are arranged vertically below the horizontal plane VS, which includes the rotation center CS of the sprocket unit 21.

Condition 18: The straight line connecting the centers CB of the internal threads 17a of the two bosses 107 is defined as an imaginary line A, and the straight line including the rotation center CS of the sprocket unit 21 and perpendicular to the imaginary line A is defined as an imaginary line B. A vector VE is defined that extends from the rotation center CS of the sprocket unit 21 toward the intersection C of the imaginary line A and the imaginary line B. The two bosses 107 are arranged such that the vector VE has a vertically downward component.

Condition 19: A line segment that connects the two bosses 107 by the shortest distance is longer than the diameter DS of the part of the outer periphery 27 of the sprocket unit 21 that is radially inside the two bosses 107. That is, the distance G8 between the two bosses 107 is shorter than the diameter DS.

In such an installing structure, the vertical plane D, which includes the rotation axis of the sprocket unit 21, is located between the two bosses 107. The center of gravity of the sprocket unit 21 is located on the rotation axis of the sprocket unit 21. Thus, when the sprocket unit 21 falls from the attaching position (the position shown in FIG. 12), gravity acts to cause the sprocket unit 21 to move through between the two bosses 107. In this installing structure, the distance G8 between the two bosses 107 is shorter than the diameter DS of the part of the outer periphery 27 of the sprocket unit 21 that is radially inside the bosses 107. Thus, the distance is narrow such that the sprocket unit 21 cannot pass through. Therefore, when the sprocket unit 21 falls from the attaching position, the two bosses 107 and the sprocket unit 21 engage with each other, so that falling of the sprocket unit 21 is restrained. Also, by moving the sprocket unit 21 in a direction away from the two bosses 107 (for example, vertically upward), the sprocket unit 21 can be moved and removed without being blocked by the bosses 107. Further, by moving the sprocket unit 21 toward the two bosses 107, the sprocket unit 21 can be guided to the attaching position without being blocked by the bosses 107. This structure can be achieved by providing only the two bosses 107.

When only the two bosses 107 that protrude to positions that face the outer periphery 27 of the sprocket unit 21 in the radial direction are provided, one of the bosses 107 may be arranged vertically above the horizontal plane VS. This installing structure operates in the same manner and has the same advantages as the structure in which the two bosses 107 are both located vertically below the horizontal plane VS.

In addition to the bosses that protrude to positions that face the outer periphery 27 of the sprocket unit 21 in the radial direction, bosses that do not protrude to such positions may be provided at any positions about the annular groove 14c of the chain cover 14. For example, as indicated by the broken line in FIG. 12, a boss 108 may be provided that is located vertically above the horizontal plane VS, which includes the rotation center CS of the sprocket unit 21. The boss 108 does not protrude to a position that faces the outer periphery 27 of the sprocket unit 21. In the example of FIG. 12, the two bosses 107, which protrude to positions that face the outer periphery 27 of the sprocket unit 21 in the radial direction, are provided vertically below the horizontal plane VS.

In this installing structure, the boss 108 is provided at a position forward of the sprocket unit 21 in the moving direction in the removing operation and the attaching operation (specifically, a position vertically above the sprocket unit 21 in the removing operation and a position vertically below the sprocket unit 21 in the attaching operation). However, the sprocket unit 21 is allowed to move between the outside of the space covered by the chain cover 14 and the attaching position without being blocked by the boss 108. Further, the electric motor 23 is fixed at three positions, which are the two bosses 107 vertically below the sprocket unit 21 and the boss 108 vertically above the sprocket unit 21. Compared to a structure without the boss 108, the fixing positions of the electric motor 23, that is, the positions of the bosses at which the electric motor 23 is fixed with bolts, are prevented from being concentrated about the electric motor 23. This allows the electric motor 23 to be stably fixed to the chain cover 14.

The installing structure of this embodiment may be applied to an internal combustion engine that has a cover member, which is provided separately from the cylinder head cover 15. This cover member is attached to the engine body 11a or the chain cover 14 to close the access opening 16 and is removed from the engine body 11a or the chain cover 14 to open the access opening 16.

Figure 13:
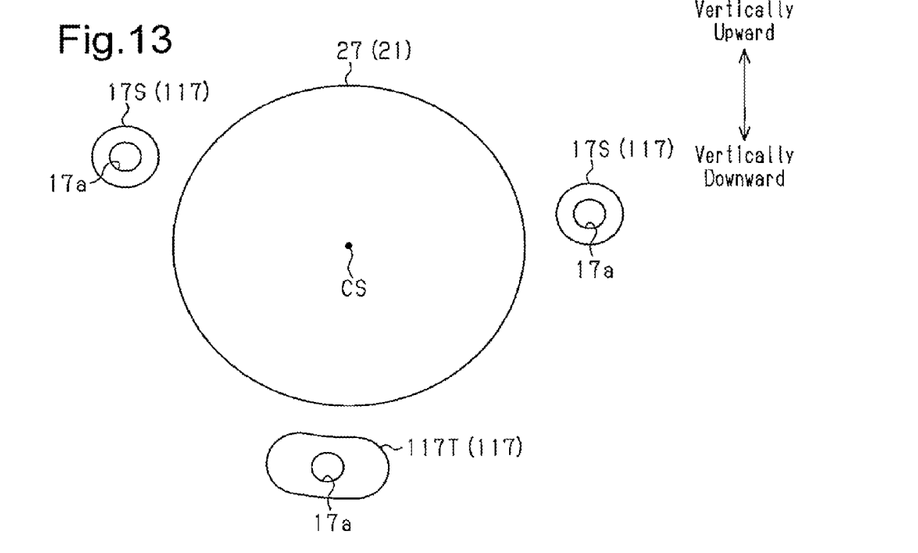
FIG. 13 is a schematic diagram showing a positional relationship between the outer periphery of a sprocket unit and three bosses in another embodiment.

The outer shapes of the bosses that protrude to positions that face the outer periphery 27 of the sprocket unit 21 are not limited to circular cross-sectional shapes, but may be polygonal cross-sectional shapes, elliptic cross-sectional shapes, or oblong cross-sectional shapes. FIG. 13 shows an example in which one of bosses 117, which protrude to positions that face the outer periphery 27 of the sprocket unit 21, is a boss 117T that has an oblong shape extending along the outer periphery 27.

Figure 14:
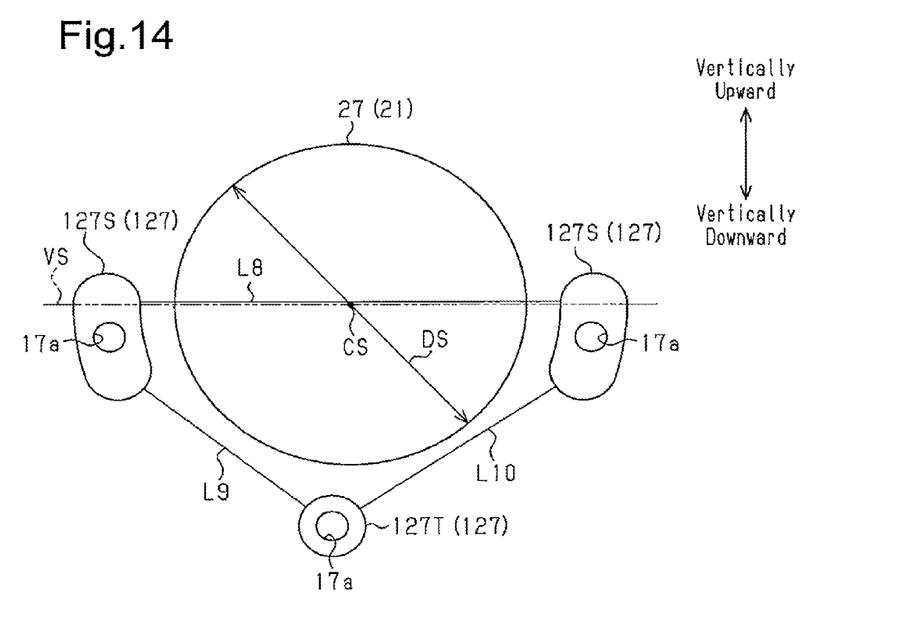
FIG. 14 is a schematic diagram showing a positional relationship between the outer periphery of a sprocket unit and three bosses in another embodiment.

In a structure with three or more bosses as exemplified by FIG. 14, in which three bosses 127 are provided, if the first bosses 127S have shapes extending along the outer periphery 27 of the sprocket unit 21, the positions of the bosses 127S are defined to meet the following conditions 20, 21.

Condition 20: The line segments that connect adjacent pairs of bosses 127 along the outer periphery 27 of the sprocket unit 21 are defined as line segments L8 to L10. Among the three line segments L8 to L10, the line segment L8, which passes through a location vertically above the rotation center CS of the sprocket unit 21 and connects the two first bosses 127S by the shortest distance, is longer than the maximum diameter (the diameter DS) of the part of the sprocket unit 21 that is radially inside the three bosses 127.

Condition 21: The line segments L9, L10, each of which connects adjacent bosses 127, at least one of which is a second boss 127T. The line segments L9, L10 are shorter than the diameter DS.

In this installing structure, when moving vertically downward from the attaching position, the sprocket unit 21 engages with a plurality of bosses 127, the distance between which is narrow so that the sprocket unit 21 does not pass. Thus, at least two of the bosses 127 engage with the sprocket unit 21 to restrain falling of the sprocket unit 21. Further, the distance between parts of the two first bosses 127S through which the sprocket unit 21 passes when moved vertically upward is sufficiently large to allow the sprocket unit 21 to pass through. Accordingly, the sprocket unit 21 can be removed and installed through the space between the two first bosses 127S.

The example shown in FIG. 14 meet the conditions 5 and 6 (see FIG. 6). This example has the advantage (2). In this case, in each of the conditions and the advantage (2), "three bosses 17,", "first bosses 17S," and "second boss 17T" are deemed to be replaced with "three bosses 127," "first bosses 127S," and "second boss 127T," respectively. The example of FIG. 14 also meets the condition 7. Thus, compared to a structure in which one of the two first boss 127S is located vertically below the horizontal plane VS, the sprocket unit 21 is less likely to fall vertically downward over the first bosses 127S. This reliably restrains falling of the sprocket unit 21.

Therefore, the present examples and embodiments are to be considered as illustrative and not restrictive and the disclosure is not to be limited to the details given herein.

The invention claimed is:

1. An installing structure for an electric variable valve timing apparatus, the installing structure comprising:
   a sprocket unit, which is attached to a camshaft of an internal combustion engine, and
   an electric motor, which is coupled to the sprocket unit, the sprocket unit includes
      a first rotor, which is fixed to one end of the camshaft,
      a second rotor, which surrounds a circumference of the first rotor,
      a sprocket, which is provided integrally with an outer periphery of the second rotor, wherein a timing chain of the internal combustion engine is looped over the sprocket, and
      a varying mechanism, which is provided between the first rotor and the second rotor to couple the first rotor and the second rotor while allowing the rotors to rotate relative to each other,
   the electric motor is fixed to a chain cover, which covers the timing chain, with bolts and is coupled to the varying mechanism to actuate the varying mechanism,
   the chain cover includes a plurality of bosses each having an internal thread to which one of the bolts is threaded,
   the plurality of bosses extends from the chain cover toward the sprocket unit to positions at which the plurality of bosses faces an outer periphery of the sprocket unit in a radial direction, and
   the plurality of bosses is arranged such that
      when the sprocket unit moves vertically downward from an attaching position, at which the sprocket unit is attached to the camshaft, at least two of the plurality of bosses are engaged with the sprocket unit to restrict vertically downward movement of the sprocket unit, and
      the sprocket unit is allowed to move between a location outside of a space covered by the chain cover and the attaching position.

2. The installing structure according to claim 1, wherein the plurality of bosses is arranged along the outer periphery of the sprocket unit,
   the plurality of bosses includes two first bosses and a second boss, which is different from the first bosses,
   the first bosses are adjacent to each other and located on opposite sides of a vertically uppermost part of the outer periphery of the sprocket unit,
   two tangents that include a rotation center of the sprocket unit and contact vertically upper parts of the first bosses define an angle less than 180° on a side corresponding to the vertically uppermost part of the sprocket unit,
   the second boss is located vertically below a line segment that connects two contact points of the two tangents with the two first bosses,
   a line segment that passes through a location vertically above the rotation center of the sprocket unit and connects the two first bosses by a shortest distance is longer than a maximum diameter of a part of the sprocket unit that is radially inside the two bosses, and
   a line segment that connects two of the plurality of bosses adjacent to each other along the outer periphery of the sprocket unit by a shortest distance is shorter than the maximum diameter, at least one of the two of the plurality of bosses being the second boss.

3. The installing structure according to claim 2, wherein each of the plurality of bosses has a columnar shape that extends coaxially with the associated internal thread,
   a straight line connecting centers of the internal threads of the two first bosses is defined as a first imaginary line,
   a straight line including the rotation center of the sprocket unit and perpendicular to the first imaginary line is defined as a second imaginary line,
   a vector that extends from the rotation center toward an intersection of the first imaginary line and the second imaginary line has a vertically upward component, and
   the second boss is arranged vertically below the first imaginary line.

4. The installing structure according to claim 1, wherein the plurality of bosses includes three bosses, and
   when a triangle is defined, vertices of which coincide with the centers of the internal threads of the three bosses, and three inner angles of the triangle are all acute angles.

5. The installing structure according to claim 2, wherein the two first bosses are each arranged to be at least partly vertically above a horizontal plane that includes the rotation center of the sprocket unit.

6. The installing structure according to claim 2, wherein the chain cover defines an access opening for removing the sprocket unit from the space covered by the chain cover,
   when an engine cover that covers the internal combustion engine is removed, the space covered by the chain cover is exposed to an outside via the access opening, and
   when the sprocket unit is moved linearly from the attaching position toward the access opening through between the two first bosses, a movement path of the sprocket unit does not overlap with the chain cover.

7. The installing structure according to claim 1, wherein
the plurality of bosses includes two bosses,
the two bosses are arranged on opposite sides of a vertical plane that includes a rotation axis of the sprocket unit,
at least one of the two bosses is arranged vertically below a horizontal plane that includes the rotation axis of the sprocket unit,
a straight line connecting centers of the internal threads of the two bosses is defined as a first imaginary line,
a straight line including the rotation center of the sprocket unit and perpendicular to the first imaginary line is defined as a second imaginary line,
a vector that extends from the rotation center toward an intersection of the first imaginary line and the second imaginary line has a vertically downward component, and
a line segment that connects the two bosses by a shortest distance is shorter than a maximum diameter of a part of the sprocket unit that is radially inside the two bosses.

8. The installing structure according to claim 1, wherein
the plurality of bosses includes three bosses that each have a columnar shape extending coaxially with the associated internal thread,
each of the three bosses are arranged vertically below a horizontal plane that includes a rotation axis of the sprocket unit,
when a triangle is defined, vertices of which coincide with the centers of the internal threads of the three bosses, one of three inner angles of the triangle is an obtuse angle,
two of the three bosses that are located at two vertices of the triangle corresponding to acute inner angles are first bosses,
one of the three bosses that is located at a vertex of the triangle corresponding to the obtuse inner angle is a second boss,
the two first bosses are arranged on opposite sides of a vertical plane that includes the rotation axis of the sprocket unit,
the second boss is arranged vertically below an imaginary line that connects the centers of the internal threads of the two first bosses, and
a line segment that connects one of the two first bosses and the second boss by a shortest distance and a line segment that connects the other first boss and the second boss by a shortest distance are shorter than a maximum diameter of a part of the sprocket unit that is radially inside the three bosses.

9. An internal combustion engine, comprising:
an engine body including a camshaft and a timing chain;
a chain cover covering the timing chain, wherein the chain cover defines an accommodation space and an access opening for exposing the accommodation space to an outside; and
an electric variable valve timing apparatus, which includes
a sprocket unit, which is arranged in the accommodation space and attached to the camshaft, and
an electric motor, which is coupled to the sprocket unit, wherein
the sprocket unit includes
a first rotor, which is fixed to one end of the camshaft,
a second rotor, which surrounds a circumference of the first rotor,
a sprocket, which is provided integrally with an outer periphery of the second rotor, wherein the timing chain is looped over the sprocket, and
a varying mechanism, which is provided between the first rotor and the second rotor to couple the first rotor and the second rotor while allowing the rotors to rotate relative to each other,
the electric motor is fixed to the chain cover with bolts and is coupled to the varying mechanism to actuate the varying mechanism,
the chain cover includes a plurality of bosses each having an internal thread to which one of the bolts is threaded,
the plurality of bosses extends from the chain cover toward the sprocket unit to positions at which the plurality of bosses faces an outer periphery of the sprocket unit in a radial direction, and
the plurality of bosses is arranged such that
when the sprocket unit moves vertically downward from an attaching position, at which the sprocket unit is attached to the camshaft, at least two bosses of the plurality of bosses are engaged with the sprocket unit to restrict vertically downward movement of the sprocket unit, and
the sprocket unit is allowed to move between a location outside of the accommodation space and the attaching position through the access opening.

* * * * *